US 6,710,267 B2

(12) United States Patent
Natsuyama et al.

(10) Patent No.: US 6,710,267 B2
(45) Date of Patent: Mar. 23, 2004

(54) INPUT PEN FOR TOUCH PANEL, AND INPUT PEN (75) Inventors: Yoshifumi Natsuyama, Kanagawa-ken (JP); Hiroshi Takatsuji, Tokyo-to (JP); Yoshihiri Katsu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 09/823,698

(22) Filed: Mar. 30, 2001

(65) Prior Publication Data
US 2001/0028345 A1 Oct. 11, 2001

(30) Foreign Application Priority Data

Apr. 5, 2000 (JP) ........................................ 2000-104053

(51) Int. Cl.⁷ .............................................. G06K 11/18
(52) U.S. Cl. .................... 178/19.04; 345/179; 81/9.2
(58) Field of Search ..................... 178/19.01, 19.04, 178/19.02, 19.03, 19.05, 19.06, 19.07; 345/179; 81/9.2; 15/435, 436, 445, 446; 401/208, 209, 212, 215, 216

(56) References Cited

U.S. PATENT DOCUMENTS

| 1,171,146 | A | * | 1/1916 | Scribner ..................... 81/9.2 |
| 1,915,426 | A | * | 6/1933 | Kohler ........................ 81/9.2 |
| 3,673,593 | A | * | 6/1972 | Kaye et al. ................. 347/147 |
| 3,760,660 | A | * | 9/1973 | Van Arnam et al. .......... 81/9.2 |
| 3,835,453 | A | * | 9/1974 | Narayanan ................. 382/314 |
| 5,291,213 | A | * | 3/1994 | Kraus ........................ 345/179 |
| 5,371,516 | A | * | 12/1994 | Toyada et al. .............. 345/179 |
| 5,528,008 | A | * | 6/1996 | Danek ....................... 200/52 R |
| 5,627,348 | A | * | 5/1997 | Berkson et al. .......... 178/19.04 |
| 5,861,876 | A | * | 1/1999 | Nakayam ................... 345/179 |
| 5,999,170 | A | * | 12/1999 | Ooura et al. ............... 345/179 |
| 6,261,015 | B1 | * | 7/2001 | McCauley et al. .......... 401/103 |
| 6,486,875 | B1 | * | 11/2002 | O'Donnell, Jr. ............ 345/179 |
| 6,498,604 | B1 | * | 12/2002 | Jensen ....................... 345/179 |

FOREIGN PATENT DOCUMENTS

| DE | 100 17 498 A1 | * | 11/2001 | ............ B43K/7/00 |
| EP | 1 058 204 A1 | * | 6/2000 | ............ G06K/9/22 |
| JP | 61-99238 | | 6/1986 | ........... G06F/3/033 |
| JP | 04-009796 | | 1/1992 | ........... G06F/3/033 |
| JP | 06-212518 | | 9/1994 | ........... G06F/3/033 |
| JP | 09-310869 | | 11/1997 | ............ G06F/3/03 |

* cited by examiner

Primary Examiner—Steven Saras
Assistant Examiner—Leland R. Joroensen
(74) Attorney, Agent, or Firm—Andrew J. Wojnicki, Esq.; Blanche E. Schiller, Esq.; Heslin Rothenberg Farley & Mesiti P.C.

(57) ABSTRACT

An input pen for a touch panel excellent in a using feeling without causing any flaw in a display, and an input pen. A touch ball made of, for example, an acetal resin is provided at a pen tip of an input pen. The touch ball is held via a first spring and a second spring. Furthermore, respective spring constants of the first spring and the second spring are set in such a manner as to establish the relationship of (a displacement of the first spring)>(a displacement of the second spring)>(a deformation of the touch ball) when pressing force for pressing the touch ball toward a main body shaft acts. Thus, it is possible to suppress any deformation of the soft touch ball even if the input pen is strongly pressed against a screen of a touch panel or the like.

10 Claims, 3 Drawing Sheets fig. 1 fig. 2 fig. 3

INPUT PEN FOR TOUCH PANEL, AND INPUT PEN

PRIOR FOREIGN APPLICATION

This application claims priority from Japanese patent application number 2000-104053, filed Apr. 05, 2000, which is hereby incorporated herein by reference in its entirety.

TECHNICAL FIELD

The present invention relates to an input pen for a touch panel serving as input means with respect to a touch panel for use in a computer or the like, and to an input pen.

BACKGROUND ART

In information processors such as a personal computer, a word processor, various portable information terminals and a CAD/CAM work station, there is well known high usage of a keyboard or a mouse as input means for inputting characters, operation information, and the like. On the other hand, there is used a touch panel display (hereinafter also referred to as "a touch panel"), in which operation information can be input or graphics, pictures or characters can be drawn by making a touch on the display of an information processor.

Such touch panels include an electrostatic type and a pressure-sensitive type which are classified according to a method for detecting an input position on a screen of the touch panel. An input pen formed into a pen-like shape is used as input means for inputting information with respect to the touch panel.

In the case of an electrostatic type touch panel, there is used an input pen for outputting a magnetic field from a pen tip by electromagnetism or the like. Information on a position input by the input pen with respect to the screen of the touch panel is detected by detecting the magnetic field output from the input pen on an electrostatic type panel provided on a side of the touch panel. In the touch panel of this type, inputting can be performed even in the case where the pen tip is not always brought into direct contact with the screen of the touch panel.

In the meantime, in the case of a touch panel of the pressure-sensitive type, a display is provided with a pressure-sensitive panel, and a contact position is detected by a direct touch of the tip of the input pen on a screen of the touch panel.

In the above-described input pen for the touch panel, there has conventionally arisen a problem that the direct touch of the tip of the input pen on the screen of the touch panel causes flaws in the screen of the touch panel or damages on a protective film constituting the touch panel, the panel or the like. This problem arises when a user presses the tip of the input pen against the screen of the touch panel even in the case of the input pen of the electrostatic type which need not always make a direct touch on the screen of the touch panel.

In addition, a portion indicated by the input pen can be visually confirmed with more ease as the tip of the input pen is finer. However, as the tip of the input pen becomes finer, the screen of the touch panel is more liable to be flawed.

Furthermore, in addition to the above-described problem, the input pen requires a good using feeling during operation: namely, the input pen can be smoothly moved on the screen of the touch panel without any slippage on the screen of the touch panel or any difficulty in moving.

In order to solve the above-described problems, there has been conventionally proposed, for example, the technique in which a pen tip is provided with a ball made of a material having a high friction coefficient, as disclosed in Japanese Utility Model Application Laid-Open No. 61-99238 and Published Unexamined Patent Application No. 5-197487; or the technique in which a ball is supported by a bearing, as disclosed in Published Unexamined Patent Application No. 11-143620. However, the current situation is that the above-described problems cannot be completely solved.

SUMMARY OF THE INVENTION

The present invention has been accomplished in an attempt to solve the above-described technical problems experienced by the prior art. Therefore, an object of the present invention is to provide an input pen for a touch panel excellent in a using feeling without causing any flaw in the touch panel, and an input pen.

With the above-described object, a study by inventors has revealed that a screen of a touch panel can be prevented from being flawed if a pen tip is made of a resin or the like. Furthermore, the pen tip is constituted of a rotatable ball in order to smoothly move an input pen on the screen of the touch panel. That is, the ball of the pen tip is made of a resin or the like. At this time, it is preferable that the ball should be made of a resin as soft as possible in order to make the screen of the touch panel difficult to be flawed. In this way, it seemed that the above-described problems could have been solved. However, a further study has revealed that when the input pen is pressed against the screen of the touch panel, the soft ball is deformed by the pressing force, so that the ball cannot be smoothly rotated.

From these studies, an input pen for a touch panel according to the present invention proposed by the present inventors comprises: a touch ball, which is made of a resin and is disposed at the tip end of the input pen; and a bearing ball, which is interposed between the touch ball and a main body of the input pen, for rotatably supporting the touch ball, and is harder than the touch ball. In the input pen for a touch panel according to the present invention, desired inputting such as drawing can be carried out by rolling the touch ball on the touch panel. Since the touch ball is made of a resin, it is possible to prevent the screen of the touch panel from being flawed. Only the use of the touch ball made of a resin may make smooth rotation of the touch ball difficult because the touch ball is deformed when the input pen is pressed against the touch panel. However, the provision of the bearing ball harder than the touch ball can allow the touch ball to be smoothly rotated.

Moreover, the input pen for the touch panel according to the present invention is provided a resilient member interposed between the bearing ball and the input pen. Consequently, when the pressing force acting on the touch ball is increased by pressing the input pen, the pressing force can be absorbed by the resilient member, thereby suppressing the deformation of the touch ball.

Furthermore, the input pen for the touch panel according to the present invention comprises: a touch ball rotatably held at the tip end of the input pen; and a resilient member for allowing the touch ball to be shifted along an axial direction of the input pen, wherein a resilient constant of the resilient member is set in such a manner that a shift of the touch ball is greater than a deformation of the touch ball when the input pen is pressed in the axial direction. With this configuration, the displacement of the resilient member becomes greater than the deformation of the touch ball when the pressing force for pressing the input pen in the axial direction of the input pen is increased, so that the touch ball can be smoothly rotated while the deformation of the touch ball can be suppressed by the difference.

Additionally, the input pen for the touch panel according to the present invention is provided with a holder which is movable along the axial direction of the input pen and has an opening at the tip end thereof, wherein the holder contains therein the touch ball in the state in which a part of the touch ball is exposed to the opening; and the resilient member includes a first resilient member for pressing the holder toward the tip end of the input pen and a second resilient member for pressing the touch ball toward the opening, wherein a resilient constant of the first resilient member is smaller than that of the second resilient member. With this configuration, the holder containing the touch ball therein is greatly displaced since the first resilient member is more greatly displaced than the second resilient member when the pressing force for pressing the input pen to act on the pen tip is increased, so that the displacement of the touch ball in the holder can be suppressed by the difference. Consequently, it is possible to make it difficult that the touch ball is embedded in the holder from the opening of the holder.

Furthermore, in the input pen for the touch panel according to the present invention, the touch ball is softer than a screen of a touch panel to be input. Consequently, it is possible to prevent the screen of the touch panel from being flawed by the touch ball. Even the soft touch ball can be suppressed from being deformed when the input pen is pressed in the axial direction, so that the touch ball can be smoothly rotated. The touch ball is preferably made of a material such as a soft resin, for example, acetal resins, or rubber.

An input pen according to the present invention comprises: an input pen body to be grasped by an input operator; a rolling member which is disposed at the tip end of the input pen body and rolls on a screen to be input so as to carry out inputting; and deformation suppressing means for suppressing a deformation of the rolling member when the input pen is pressed against the screen to be input. In the input pen, the deformation suppressing means can suppress the deformation of the rolling member when the input pen is pressed against the screen to be input to increase pressing force acting on the rolling member at the pen tip. Consequently, the rolling member can be smoothly rolled, thereby achieving an excellent operating feeling of the input pen. As the rolling member or the deformation suppressing means may be used any type which fulfills a predetermined function.

Moreover, in the input pen according to the present invention, the rolling member is rotatably supported, and there is provided friction reducing means for reducing frictional resistance with the input pen body during the rotation. Consequently, the rolling member can be smoothly rolled, thus making the above-described effect more prominent. As the friction reducing means may be used a ball bearing or the like in addition to the bearing ball.

Otherwise, the input pen for the touch panel according to the present invention comprises: a pen body of the input pen for a touch panel; a holder which is movably disposed in an axial direction of the pen body and has an opening at the tip end; first pressing means for pressing the holder toward the tip end of the pen body; a touch ball which is rotatably contained in the holder in such a manner that a part thereof is exposed to the opening and rolls on the touch panel; and second pressing means for pressing the touch ball toward the tip end inside the holder. In this type of input pen for the touch panel, the holder and the touch ball are normally pressed by the first and second pressers, and thus, are located at predetermined positions. When the input pen for the touch panel is pressed against the touch panel to increase the pressing force acting on the touch ball, the holder is moved over the pressing force of the first pressing means, and simultaneously, the touch ball is moved inside the holder over the pressing force of the second pressing means. These movements of the holder and the touch ball deform the first and second pressers. The pressing force acting on the touch ball can be alleviated by energy consumption at the time of the deformation. Consequently, it is possible to prevent any deformation of the touch ball so as to achieve the smooth rolling of the touch ball.

Additionally, in the input pen for the touch panel according to the present invention, a guide member movable in the axial direction of the pen body is interposed between the touch ball and the second pressing means, wherein a moving stroke of the guide member is set in such a manner that at least a part of the touch ball always projects outward of the opening of the holder. The guide member can prevent the touch ball from being embedded in the holder.

Moreover, a bearing ball harder than the touch ball is rotatably held by the guide member; and the touch ball is rotatably held inside the holder via the bearing ball. Consequently, the touch ball can be smoothly rotated. Furthermore, the bearing ball has a diameter smaller than that of the touch ball, thereby contributing to miniaturization of the pen tip.

BRIEF DESCRIPTION OF DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Hereinafter, the present invention will be described in details by way of preferred embodiments illustrated in the attached drawings.

Figure 1:
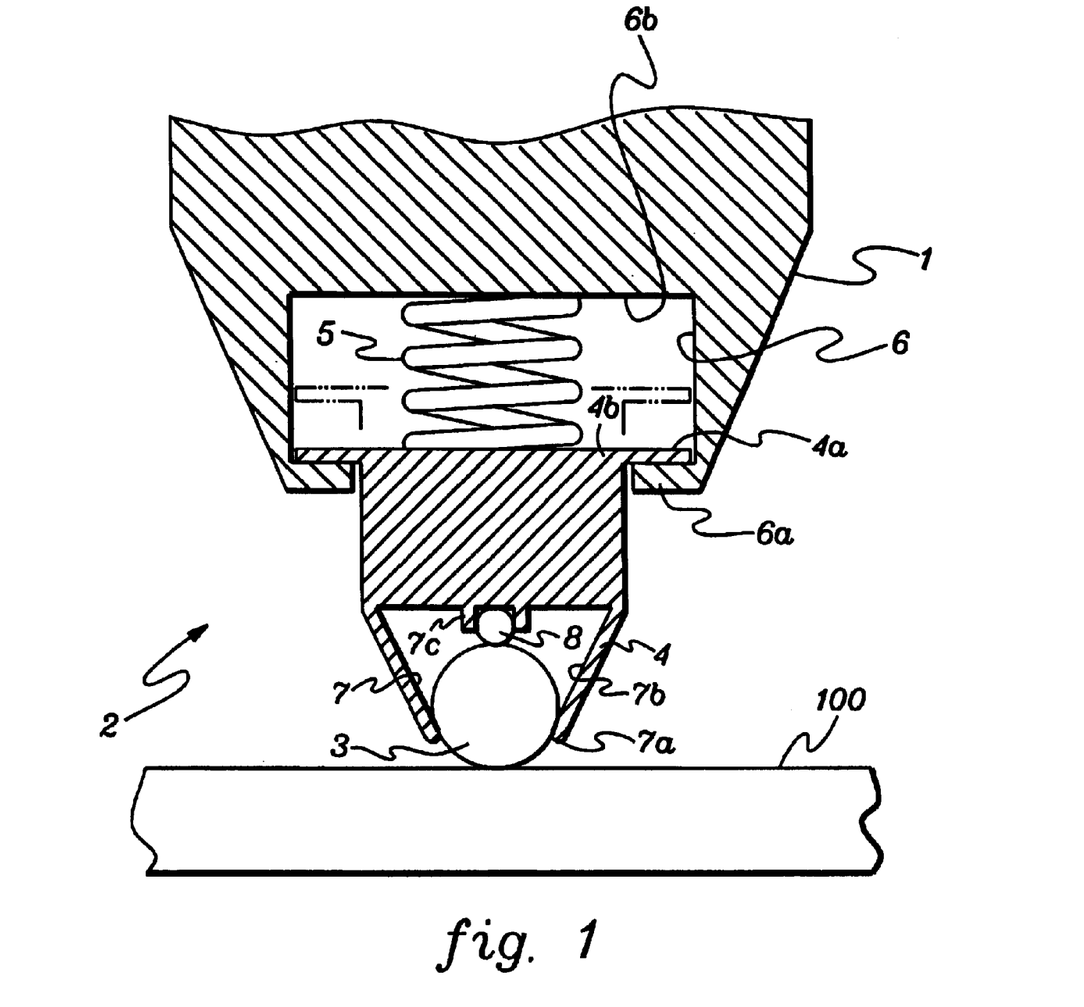
FIG. 1 is a cross-sectional view showing the configuration of a tip of an input pen for a touch panel and an input pen in a first preferred embodiment according to the present invention.
Figure 2:
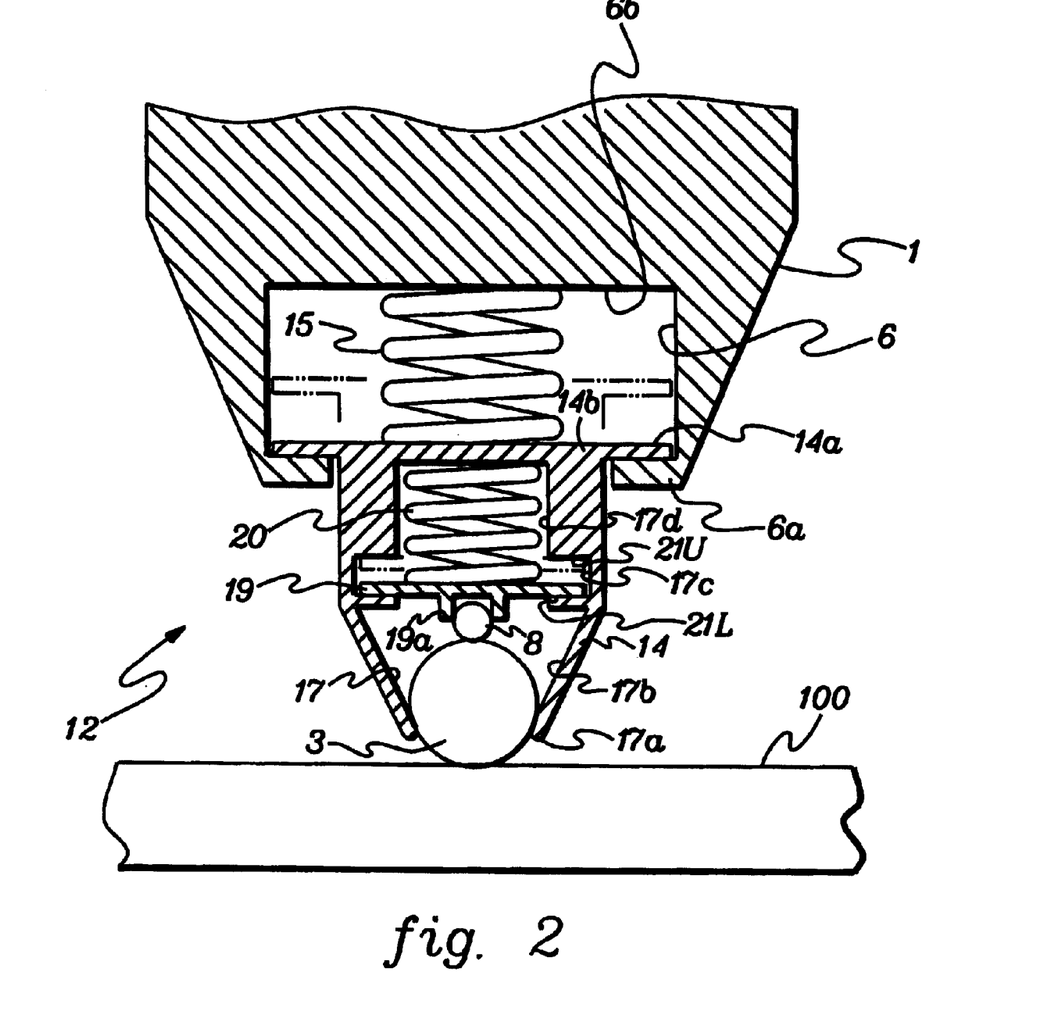
FIG. 2 is a cross-sectional view showing the configuration of a tip of an input pen for a touch panel and an input pen in a second preferred embodiment according to the present invention.
Figure 3:
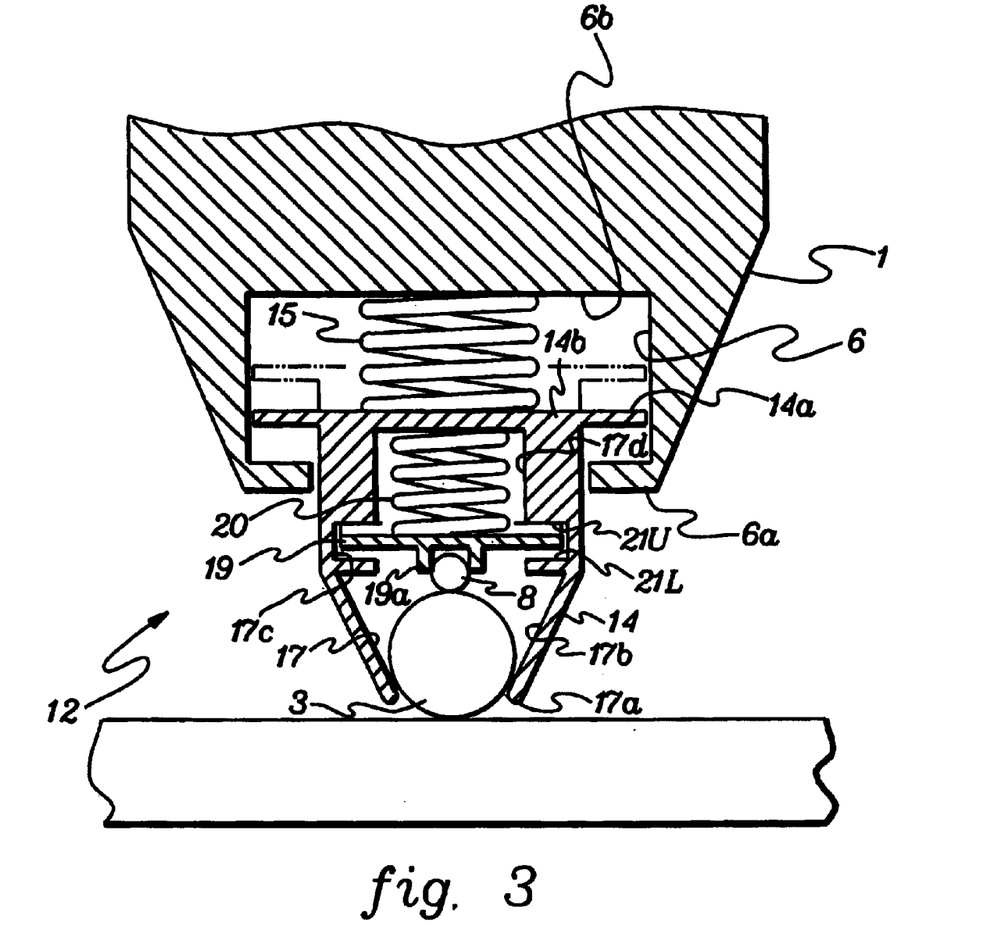
FIG. 3 is a cross-sectional view illustrating the state in which the tip of the input pen shown in FIG. 2 is pressed.

FIGS. 1 to 3 are cross-sectional views showing the configuration of a tip of an input pen for a touch panel and an input pen in the preferred embodiments according to the present invention. For the convenience of simple explanation, a side of the tip end of the input pen (downward in the drawing sheet) is referred to "a lower side," and a side of an opposite end (upward in the drawing sheet) is referred to "an upper side."

In FIG. 1, reference numeral 1 designates a main body shaft of an input pen (pen body); 2, a pen tip provided at the tip end of the main body shaft 1; and 3, a touch ball (tip end member) provided at the pen tip 2.

Here, the pen tip 2 is provided with a holder 4 containing the touch ball 3 therein and a spring (a resilient member, or deformation suppressing means) 5 interposed between the holder 4 and the main body shaft 1.

The holder 4 is disposed in a recess 6 formed at the tip end of the main body shaft 1, and is formed as a whole into a tapered shape having an outer diameter gradually smaller toward the lower end thereof. A flange 4a extending toward the outer periphery is formed at the upper end of the holder 4. In the meantime, the recess 6 is formed in such a manner as to have an inner diameter slightly larger than the flange 4a, and is provided at the lower end thereof with a holding flange 6a extending toward the inner circumference and having an inner diameter smaller than the flange 4a. Consequently, the holder 4 can be freely moved in a vertical direction between the holding flange 6a and an upper surface 6b inside the recess 6.

The spring 5 is contained inside the recess 6, is interposed between the upper surface 6b of the recess 6 and an upper surface 4b of the holder 4 in a compressed state, and presses the holder 4 toward the lower end.

In the holder 4 is formed a recess 7 having an opening 7a at the lower surface thereof. The recess 7 contains therein the touch ball 3 and a bearing ball (friction reducing means) 8.

Here, the touch ball 3 is formed into a globular shape having a predetermined outer diameter, and is preferably made of a material which hardly makes a flaw in a screen 100 of a touch panel to be used (a screen to be input), more particularly, a material softer than that constituting the screen 100 of a touch panel, for example, a soft resin such as an acetal resin, or a rubber material.

The bearing ball 8 is adapted to reduce sliding resistance of the touch ball 3 so as to make the touch ball 3 rotatable, and is preferably made of a material harder than the touch ball 3, for example, metal such as iron or stainless. The bearing ball 8 has a diameter smaller than that of the touch ball 3, thereby contributing to miniaturization of the pen tip 2.

The opening 7a of the recess 7 is formed in such a manner as to have a diameter smaller by a predetermined dimension than that of the touch ball 3. Consequently, a part of the touch ball 3 is exposed (projects) from the opening 7a. A ball retainer 7b having a gradually enlarged inner diameter for holding the touch ball 3 is formed in continuation with the opening 7a. At the upper surface of the ball retainer 7b is formed a pedestal 7c for rotatably holding the bearing ball 8. The touch ball 3 contained inside the recess 7 is rotatably held by the bearing ball 8 held in the pedestal 7c in the state in which a part of the touch ball 3 always projects from the opening 7a of the holder 4.

In the pen tip 2 having the above-described constitution, when force for pressing the touch ball 3 toward the main body shaft 1 acts between the touch ball 3 and the spring 5, a spring constant (a resilient constant) of the spring 5 is set in such a manner as to satisfy the following relationship:

(a displacement of the spring 5)>(a deformation of the touch ball 3).

In the input pen as described above, the flange 4a of the holder 4 is normally pressed against the holding flange 6a of the recess 6 in the main body shaft 1 by the spring 5 in the compressed state, and is positioned there.

In this state, when the touch ball 3 at the pen tip 2 of the input pen is brought into contact with the screen 100 of the touch panel and is moved along the screen 100 of the touch panel, for example, the touch ball 3 rotatable via the metallic bearing ball 8 is rolled by friction with the screen 100 of the touch panel, so that the input pen can be smoothly moved. Consequently, for example, a button or tub displayed on a display is operated, or arbitrary input operation such as drawing of graphics, pictures or characters can be performed.

When the pen tip 2 is strongly pressed against the screen 100 of the touch panel so as to increase the pressing force which acts on the screen 100 of the touch panel during the use, the spring 5 is greatly compressed, so that the holder 4 is pushed upward inside the recess 6. At this time, since the deformations of the touch ball 3 and the spring 5 satisfy the relationship of the spring 5 being greater than the touch ball 3, it is possible to suppress the deformation of the touch ball 3 made of a soft resin to the minimum by the compression of the spring 5 in the state in which the pen tip 2 is strongly pressed against the screen 100 of the touch panel.

In this manner, when the input pen is moved to draw, for example, characters or pictures in the state in which the input pen is pressed against the screen 100 of the touch panel or the like, the deformation of the touch ball 3 is invariable irrespectively of the presence of the spring 5 if the pressing force is kept constant. At this time, since the deformation of the soft touch ball 3 is suppressed to the minimum, and further, is supported via the hard bearing ball 8, the touch ball 3 can be smoothly rotated.

During actual movement of the input pen for drawing characters, pictures or the like, the pressure for pressing the input pen against the screen 100 of the touch panel (equivalent to so-called tool force) is not always kept constant; to the contrary, it is normally varied all the time. Even if such a pressure is varied and the pressing force acting on the touch ball 3 is increased, the spring 5 can suppress the variations in deformation of the touch ball 3 so as to allow the touch ball 3 to be smoothly rotated.

As described above, the pen tip 2 of the input pen is provided with the soft touch ball 3 made of, for example, an acetal resin, thereby preventing the screen 100 of the touch panel from being flawed. Moreover, since the touch ball 3 softer than the screen 100 of the touch panel is provided on the side of the input pen, the input pen more inexpensive than the touch panel is first broken during long-term use, thereby suppressing a loss to the minimum.

Here, mere making the pen tip of a soft material cannot achieve the smooth movement of the input pen since the pen tip is largely deformed by the pressing force when the input pen is moved along the screen 100 of the touch panel. To the contrary, as described above, the soft touch ball 3 is held via the spring 5, so that the deformation of the soft touch ball 3 can be suppressed so as not to interfere with the rotation of the touch ball 3 even if the input pen is strongly pressed against the screen 100 of the touch panel. Moreover, the rotation of the touch ball 3 can be smoothened also by rotatably supporting the touch ball 3 via the hard bearing ball 8. In this manner, it is possible to achieve the smooth using feeling all the time in the above-described input pen.

Furthermore, when the pen tip 2 of the input pen pricks the screen 100 of the touch panel or the like, it is possible to suppress the pressure (the pressing force) acting on the screen 100 of the touch panel, so as to prevent any flaw or the like in the screen 100 of the touch panel by the effects of the soft touch ball 3 and the spring 5.

Additionally, since the holder 4 is formed into a tapered shape narrower toward the lower end, it is possible to configure the input pen excellent in the using feeling without any interference with the visual confirmation of a portion indicated on the screen 100 of the touch panel by the input pen.

Next, description will be given of an input pen for a touch panel and an input pen in a second preferred embodiment according to the present invention by way of an example of the configuration in which resilient members are provided at two stages. Constituent elements common to those in the first embodiment are denoted by the same reference numerals, and therefore, the description thereof will be omitted to avoid duplication.

As shown in FIG. 2, a pen tip 12 of an input pen for a touch panel comprises: a holder 14 containing therein a touch ball 3 made of, for example, an acetal resin; and a first spring (a resilient member, a first resilient member, deformation suppressing means, or first pressing means) 15 interposed between the holder 14 and a main body shaft 1.

The holder 14 is disposed in a recess 6 formed at the tip end of the main body shaft 1, and is formed as a whole into a tapered shape having an outer diameter gradually smaller toward the lower end thereof. A flange 14a extending toward the outer periphery is formed at the upper end of the holder 14. Consequently, the holder 14 can be freely moved in a vertical direction between a holding flange 6a and an upper surface 6b inside the recess 6.

The first spring 15 is contained inside the recess 6, is interposed between the upper surface 6b of the recess 6 and the upper surface 14b of the holder 14 in a compressed state, and presses the holder 14 toward the lower end.

In the holder 14 is formed a recess 17 having an opening 17a at the lower surface thereof. The recess 17 contains therein the touch ball 3, a bearing ball 8 made of, for example, metal, a guide member 19, and a second spring (a resilient member, a second resilient member, deformation suppressing means, or second pressing means) 20.

The guide member 19 is formed into a disc shape, and is integrally provided at the lower surface thereof with a pedestal 19a for rotatably holding the bearing ball 8.

The second spring 20 is interposed between the upper surface of the guide member 19 and the upper surface of the recess 17 in a compressed state, thereby pressing the touch ball 3 toward the opening 17a of the holder 14 via the guide member 19 and the bearing ball 8.

In the recess 17, a ball retainer 17b for retaining the touch ball 3, a guide 17c for guiding the guide member 19, and a spring holder 17d containing the second spring 20 therein in order from the side of the opening 17a.

The opening 17a is formed in such a manner as to have a diameter smaller by a predetermined dimension than that of the touch ball 3. Consequently, a part of the touch ball 3 is exposed (projects) from the opening 17a. The ball retainer 17b is formed such that the inner diameter is gradually increased from the opening 17a. The guide 17c has a diameter slightly greater than that of the guide member 19, and is provided at the lower portion thereof with a lower stopper 21L projecting inward and at the upper portion thereof with an upper stopper 21U constituted with a step between the spring holder 17d and the same. The inner diameter of each of the lower stopper 21L and the upper stopper 21U is smaller than the outer diameter of the guide member 19. Consequently, the guide member 19 can be vertically moved in the guide 17c such that its vertical stroke is restricted by the lower stopper 21L and the upper stopper 21U. Here, the vertical stroke of the guide member 19 is set such that the touch ball 3 projects downward from the opening 17a of the holder 14 in the state in which the guide member 19 is brought into contact with the upper stopper 21U. Thus, the guide member 19 can restrict the touch ball 3 in such a manner that the touch ball 3 projects from the opening 17a all the time but is never embedded in the recess 17.

In the pen tip 12 having the above-described constitution, when force for pressing the touch ball 3 toward the main body shaft 1 acts among the touch ball 3, the first spring 15 and the second spring 20, a spring constant of each of the first spring 15 and the second spring 20 is set in such a manner as to satisfy the following relationship:

(a displacement of the first spring 15)>(a displacement of the second spring 20)>(a deformation of the touch ball 3).

That is, the spring constant of the first spring 15 is smaller than that of the second spring 20, and further, the spring constant of the second spring 20 is set in such a manner that the second spring 20 becomes softer than the touch ball 3.

In the input pen as described above, the touch ball 3 is normally pressed against and positioned at the opening 17a of the holder 14 by the first spring 15 and the second spring 20 in the compressed state. The flange 14a of the holder 14 is pressed against and positioned at the holding flange 16a of the recess 6 in the main body shaft 1.

In this state, when the touch ball 3 at the pen tip 12 of the input pen is brought into contact with the screen 100 of the touch panel and is moved along the screen 100 of the touch panel, for example, the touch ball 3 rotatable via the metallic bearing ball 8 is rolled by friction with the screen 100 of the touch panel, so that the input pen can be smoothly moved. Consequently, arbitrary input operation can be performed.

As shown in FIG. 3, when the pen tip 12 is strongly pressed against the screen 100 of the touch panel so as to increase the pressing force which acts on the screen 100 of the touch panel during the use, first, the first spring 15 having the smallest spring constant is greatly compressed, so that the holder 14 is pushed upward inside the recess 6, and subsequently, the second spring 20 is compressed so as to press the touch ball 3 upward inside the holder 14. Furthermore, since the deformations of the touch ball 3, the first spring 15 and the second spring 20 satisfy the relationship of the first spring 15>the second spring 20>the touch ball 3, it is possible to suppress the deformation of the touch ball 3 made of a soft resin to the minimum by the compression of the first spring 15 and the second spring 20 in the state in which the pen tip 12 is strongly pressed against the screen 100 of the touch panel.

In this manner, when the input pen is moved to draw, for example, characters or pictures in the state in which the input pen is pressed against the screen 100 of the touch panel or the like, the deformation of the touch ball 3 is invariable irrespectively of the presence of the first spring 15 and the second spring 20 if the pressing force is kept constant. At this time, since the deformation of the soft touch ball 3 is suppressed to the minimum, and further, is supported via the hard bearing ball 8, the touch ball 3 can be smoothly rotated.

During the movement of the input pen for drawing characters, pictures or the like, even if a pressure for pressing the input pen against the screen 100 of the touch panel is increased, the first spring 15 and the second spring 20 can suppress an increase in deformation of the touch ball 3 so as to allow the touch ball 3 to be smoothly rotated.

Moreover, the vertical movement of the touch ball 3 inside the holder 14 is restricted by the stroke of the guide member 19 between the lower stopper 21L and the upper stopper 21U. Consequently, the touch ball 3 can be maintained in a state projecting from the opening 17a all the time. Here, the dimension of the touch ball 3 projecting from the opening 17a is fine, and the stroke of the guide member 19 becomes fine accordingly. However, since the deformation of the first spring 15 is greater than that of the second spring 20, it is possible to delay to the maximum the timing when the guide member 19 is brought into contact with the upper stopper 21U.

As described above, in the same manner as the first embodiment, the pen tip 12 of the input pen is provided with the soft touch ball 3 made of, for example, an acetal resin, thereby preventing the screen 100 of the touch panel from being flawed. Furthermore, also when the pen tip 12 pricks the screen 100 of the touch panel or the like, it is possible to prevent any flaw or the like in the screen 100 of the touch panel by the effects of the soft touch ball 3, the first spring 15 and the second spring 20.

Furthermore, the soft touch ball 3 is held via the first spring 15 and the second spring 20, so that the deformation of the soft touch ball 3 can be suppressed so as not to interfere with the rotation of the touch ball 3 even if the input pen is strongly pressed against the screen 100 of the touch panel. This effect becomes more prominent in comparison with the above-described first embodiment in which only the spring 5 is provided at one stage. Moreover, the rotation of the touch ball 3 can be smoothened also by rotatably supporting the touch ball 3 via the hard bearing ball 8. In this manner, it is possible to achieve the smooth using feeling all the time in the above-described input pen.

Although in the above-described second embodiment, the description has been given of the magnitude of the spring constants of the first spring 15 and the second spring 20, the magnitude may be set reversely. That is, the spring constant of the second spring 20 may be smaller than that of the first spring 15. However, in this case, sufficient attention need be paid in such a manner that the touch ball 3 is never embedded in the holder 14 with ease.

While in the above-described embodiments, the acetal resin exemplifies the material of the touch ball 3, any other material softer than that of the screen 100 of the touch panel such as rubber may be used. An appropriate material may be selected according to the material of the touch panel or the like to be used. The entire touch ball 3 is not always made of the above-described material, but only its surface may be made of a soft material. Furthermore, even if the touch ball 3 is made of metal or the like, the same effects as described above can be produced by using the above-described configuration including the spring 5 or the first spring 15 and the second spring 20, the holder 4 or 14, and the like.

The resilient member, the first and second resilient members, the deformation suppressing means, the first and second pressers are not limited to the spring 5, the first spring 15 and the second spring 20 listed above. Other members made of rubber or the like may be used as long as they can exhibit the required functions. Otherwise, the guide member 19 per se may be formed into a diaphragm so as to have resiliency in place of the first spring 15.

Moreover, although the touch ball 3 is rotatably supported only by the single bearing ball 8, a plurality of bearing balls may be provided. In place of the bearing ball 8, there may be provided a ball bearing or the like, as disclosed in, for example, Published Unexamined Patent Application No. 11-143620, for rotatably supporting the touch ball 3.

Additionally, although the touch ball 3 exemplifies the rolling member, the rolling member need not be always formed into a globular shape. Any other configuration including, for example, a configuration disclosed in Published Unexamined Patent Application No. 11-143620, may be used as long as the rolling member can be rolled on the screen to be input.

Moreover, the screen to be input in which the above-described input pen is used is not limited to the so-called touch panel. For example, the above-described input pen can be effectively used even in, for example, a tablet or other objects to be input. In the touch panel, the structure of the display including the panel such as a digitizer for detecting the contact position of the input pen is not limited to the above-described embodiments.

As described above, according to the present invention, since the touch ball or the rolling member made of, for example, a resin is provided on the side of the input pen, it is possible to prevent any flaw in the screen to be input such as the touch panel. Moreover, since the touch ball or the rolling member is held via the resilient member or the deformation suppressing means, the touch ball or the rolling member can be suppressed from being deformed even if the input pen is strongly pressed, so that it can be smoothly rotated. Furthermore, since the touch ball or the rolling member is rotatably supported via the hard bearing ball or the friction reducing means, the touch ball or the rolling member can be smoothly rotated. In this manner, it is possible to achieve the smooth using feeling of the input pen all the time.

What is claimed is:

1. An input pen for a touch panel, comprising:
   a touch ball, which is made of a resin and is disposed at a tip end of the input pen; and
   a bearing ball, which is interposed between the touch ball and a main body of the input pen, for rotatably supporting the touch ball, and is harder than the touch ball.

2. The input pen for a touch panel according to claim 1, wherein a resilient member is interposed between the bearing ball and the input pen body.

3. An input pen for a touch panel, comprising:
   a deformable touch ball rotatably held at a tip end of the input pen; and
   a resilient member for allowing the deformable touch ball to be shifted along an axial direction of the input pen, wherein a resilient constant of the resilient member being set in such a manner that a shift of the deformable touch ball is greater than a deformation of the deformable touch ball when the input pen is pressed in the axial direction.

4. The input pen for a touch panel according to claim 3, wherein:
   the input pen is provided with a holder which is movable along the axial direction of the input pen and has an opening at the tip end thereof, the holder containing therein the touch ball in the state in which a part of the touch ball is exposed to the opening; and
   the resilient member includes a first resilient member for pressing the holder toward the tip end of the input pen and a second resilient member for pressing the touch ball toward the opening, a resilient constant of the first resilient member being smaller than that of the second resilient member.

5. The input pen for a touch panel according to claim 4, wherein the touch ball is softer than a screen of a touch panel to be input.

6. An input pen, comprising:
   an input pen body to be grasped by an input operator;
   a deformable rolling member which is disposed at the tip end of the input pen body and rolls on a screen to be input so as to carry out inputting; and
   a deformation suppresser for suppressing a deformation of the deformable rolling member when the input pen is pressed against the screen to be input.

7. The input pen according to claim 6, further comprising a friction reducing device for rotatably supporting the rolling member and reducing frictional resistance with the input pen body during the rotation.

8. An input pen for a touch panel, comprising:

a pen body of the input pen for a touch panel;

a holder which is movably disposed in an axial direction of the pen body and has an opening at a tip end;

a first presser for pressing the holder toward a tip end of the pen body;

a touch ball which is rotatably contained in the holder in such a manner that a part thereof is exposed to the opening and rolls on the touch panel;

a second presser for pressing the touch ball toward the tip end inside the holder; and wherein a guide member movable in the axial direction of the pen body is interposed between the touch ball and the second presser, a moving stroke of the guide member being set in such a manner that at least a part of the touch ball always projects outward of the opening of the holder.

9. An input pen for a touch panel according to claim 8, wherein:

a bearing ball harder than the touch ball is rotatably held by the guide member; and the touch ball is rotatably held inside the holder via the bearing ball.

10. An input pen for a touch panel according to claim 9, wherein the bearing ball has a diameter smaller than that of the touch ball.

* * * * *

UNITED STATES PATENT AND TRADEMARK OFFICE
CERTIFICATE OF CORRECTION

PATENT NO.   : 6,710,267 B2
DATED        : March 23, 2004
INVENTOR(S)  : Natsuyama et al.

It is certified that error appears in the above-identified patent and that said Letters Patent is hereby corrected as shown below:

<u>Title page,</u>
Item [75], Inventors, delete "Yoshihiri" and insert -- Yoshihiro --

Signed and Sealed this

Eighteenth Day of May, 2004

JON W. DUDAS
*Acting Director of the United States Patent and Trademark Office*